US010385901B2

(12) United States Patent
Steltz

(10) Patent No.: US 10,385,901 B2
(45) Date of Patent: Aug. 20, 2019

(54) FASTENING CLIP ASSEMBLY

(71) Applicant: ILLINOIS TOOL WORKS INC., Glenview, IL (US)

(72) Inventor: Jeffrey J. Steltz, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 134 days.

(21) Appl. No.: 15/522,443

(22) PCT Filed: Oct. 26, 2015

(86) PCT No.: PCT/US2015/057312
§ 371 (c)(1),
(2) Date: Apr. 27, 2017

(87) PCT Pub. No.: WO2016/073231
PCT Pub. Date: May 12, 2016

(65) Prior Publication Data
US 2017/0335877 A1    Nov. 23, 2017

Related U.S. Application Data

(60) Provisional application No. 62/074,745, filed on Nov. 4, 2014.

(51) Int. Cl.
*F16B 21/08*    (2006.01)
*F16B 5/06*    (2006.01)

(52) U.S. Cl.
CPC ............... *F16B 21/08* (2013.01); *F16B 5/06* (2013.01); *F16B 5/0642* (2013.01); *F16B 21/082* (2013.01); *F16B 21/086* (2013.01)

(58) Field of Classification Search
CPC ..................................... F16B 21/086
USPC ........................................... 411/508
See application file for complete search history.

(56) References Cited

U.S. PATENT DOCUMENTS

| 3,040,401 | A | * | 6/1962 | Von Rath | F16B 5/123 135/119 |
| 3,177,540 | A | * | 4/1965 | Hall | F16B 21/086 24/453 |
| 5,046,223 | A | * | 9/1991 | Kraus | F16B 21/086 24/297 |
| 5,319,839 | A | * | 6/1994 | Shimajiri | F16B 21/086 24/297 |

(Continued)

FOREIGN PATENT DOCUMENTS

| CN | 1625655 | 6/2005 |
| CN | 101952608 | 1/2011 |

(Continued)

OTHER PUBLICATIONS

ISR & WO for PCT/US2015/057312 dated Jan. 15, 2016; 11 pages.

*Primary Examiner* — Flemming Saether
(74) *Attorney, Agent, or Firm* — Quarles & Brady LLP

(57) ABSTRACT

A fastening clip assembly is configured to secure to a component, and may include four retaining legs that are configured to directly contact portions of the component to provide four points of contact with the component, and a central pedestal including a central beam and two angled retaining beams extending from the central beam. The two angled retaining beams are configured to exert a triangular retaining force into the component.

20 Claims, 4 Drawing Sheets

(56) References Cited

U.S. PATENT DOCUMENTS

| | | |
|---|---|---|
| 6,796,006 B2 | 9/2004 | Hansen |
| 6,974,292 B2 | 12/2005 | Hansen |
| 7,669,807 B2 * | 3/2010 | Stigler .................... B60R 11/00 248/229.16 |
| 8,555,469 B2 * | 10/2013 | Iwahara ................ F16B 21/086 24/297 |
| 8,613,128 B2 | 12/2013 | Moerke et al. |
| 2002/0028123 A1 * | 3/2002 | Miura ................... F16B 19/004 411/508 |
| 2003/0143054 A1 | 7/2003 | Kanie et al. |
| 2005/0150087 A1 | 7/2005 | Lydan |
| 2008/0052878 A1 | 3/2008 | Lewis |
| 2011/0058915 A1 | 3/2011 | Scroggie et al. |

FOREIGN PATENT DOCUMENTS

| | | |
|---|---|---|
| CN | 102032253 | 4/2011 |
| CN | 102257281 | 11/2011 |
| CN | 102562749 | 7/2012 |
| JP | 2005-114171 A | 4/2005 |
| JP | 2008-57787 A | 3/2008 |
| WO | 2009/093496 A1 | 7/2009 |
| WO | 2009105378 A1 | 8/2009 |

* cited by examiner

FASTENING CLIP ASSEMBLY

RELATED APPLICATIONS

This application is a national phase of International Application Number PCT/US2015/057312 filed Oct. 26, 2015 and claims priority from U.S. Provisional Patent Application No. 62/074,745 filed Nov. 4, 2014, which is hereby incorporated by reference in its entirety.

FIELD OF EMBODIMENTS OF THE DISCLOSURE

Embodiments of the present disclosure generally relate to fastening clip assemblies.

BACKGROUND

Various assemblies include panels or objects connected to one another. Automobile assemblies, for example, include various panels and structures connected to other panels or structures, or to the automobile frame itself. In particular, snap-fit assemblies may be used to connect the pieces together. Additionally, a fastener may be preassembled with one of the components or panels, while the second component or panel is connected to the preassembly during final assembly. A plurality of the fasteners may be used when connecting relatively large components together. Such fasteners have been provided in a variety of shapes and configurations suitable for the particular components to be connected.

One type of fastener used to connect components together is a symmetrical connector having an insertion portion with a W-shape. W-shape fasteners provide quick and easy assembly. Additionally, the W-shape fasteners securely retain moldings of structural panels, while also being relatively easy to remove.

Another type of known fastener includes opposed securing members that axially collapse as the fastener is inserted into an opening of a panel. The axial collapsing of the opposed securing members allows the opposed securing members to pass through the opening.

Known fastener assemblies are also described in U.S. Pat. No. 6,796,006, entitled "Rib Clip," U.S. Pat. No. 6,974,292, entitled "One-Piece Reusable Plastic Fastener," and U.S. Pat. No. 8,613,128, entitled "Push-In Fastener Assembly."

One known fastener assembly provides a two-piece design and is configured for rectangular openings. Another known fastener assembly provides a one-piece design, but with only two points of retention.

Many known fastener assemblies include multiple pieces. Further, many known fasteners assemblies provide insufficient retention strength. Also, many known fastener assemblies are configured only for square or rectangular openings.

SUMMARY OF EMBODIMENTS OF THE DISCLOSURE

Certain embodiments of the present disclosure provide a fastening clip assembly configured to secure to a component. The fastening clip assembly may include four retaining legs that are configured to directly contact portions of the component to provide four points of contact with the component. A central pedestal may include a central beam and two angled retaining beams extending from the central beam. The two angled retaining beams are configured to exert a triangular retaining force into the component. The two angled retaining beams may form two legs of an isosceles triangle. The four retaining legs and the central pedestal may be integrally molded and formed together. The four retaining legs and the central pedestal may be configured to securely connect the fastening clip assembly to a round opening of the component.

The fastening clip assembly may also include a beveled lead-in nose connected to the central pedestal. The beveled lead-in nose is configured to guide the fastening clip assembly into a round opening of the component.

Each of the four retaining legs may include a flexible root connected to an outwardly-extending angled extension beam, which, in turn, connects to an inwardly-canted ramp. The inwardly-canted ramp is configured to compressively abut into an internal edge of a round opening of the component. The four retaining legs may be regularly spaced about a central longitudinal axis of the fastening clip assembly.

The fastening clip assembly may include a lead-in nose and an annular collar. In at least one embodiment, the central beam provides a bracing support between the lead-in nose and the annular collar. The bracing support resists crushing. The fastening clip assembly may also include an annular seal secured to the annular collar.

Certain embodiments of the present disclosure provide a securing system that may include a component having a round opening, and a fastening clip assembly secured to the component. The fastening clip assembly may include four retaining legs that directly contact portions of the component proximate to the round opening to provide four points of contact with the component, and a central pedestal including a central beam and two angled retaining beams extending from the central beam. The two angled retaining beams exert a triangular retaining force into the component.

Figure 1:
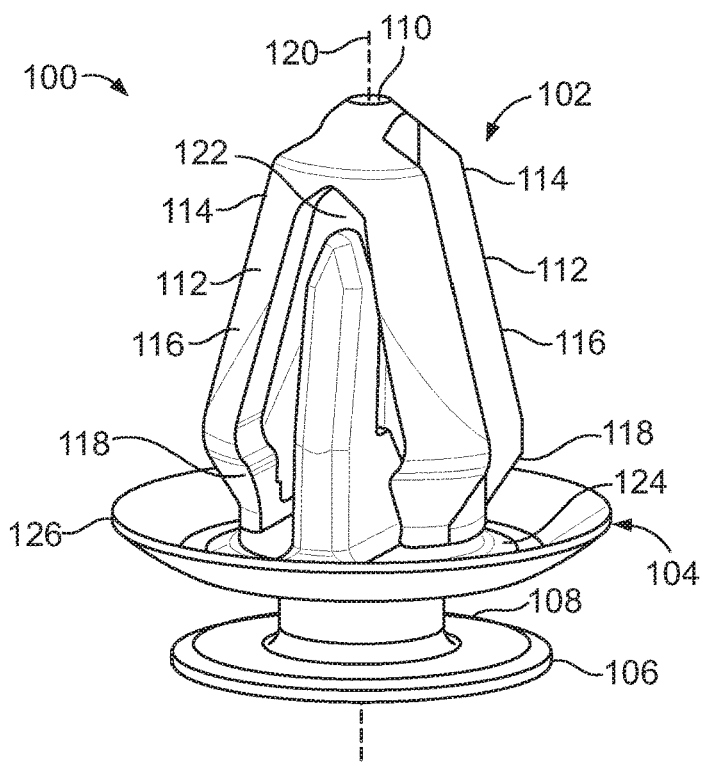
FIG. 1 illustrates a perspective front view of a fastening clip assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a fastening clip assembly that may be integrally formed and molded as a single piece. The fastening clip assembly may provide four points of retention with respect to a component, such as a panel. Also, the fastening clip assembly provides a triangular retaining force that allows for efficient insertion into and secure retention within a round opening of a panel.

Embodiments of the present disclosure provide a fastening clip assembly that exerts a triangular retaining force into a component, such as into a round opening of a panel. The fastening clip assembly is configured to be retained within a round opening of a component, such as a panel. The fastening clip assembly provides four points of retention that are strengthened and buttressed by the triangular retaining force, thereby providing equal retention from all directions of loading. The fastening clip assembly may also include a central beam (such as a central pedestal, post, or the like) that prevents crushing if the fastening clip assembly is misaligned with an opening of a panel. Embodiments of the present disclosure may be used to attach automotive interior door panels to sheet metal, for example.

FIG. 1 illustrates a perspective front view of a fastening clip assembly 100, according to an embodiment of the present disclosure. The fastening clip assembly 100 includes a panel-engaging retainer 102 integrally molded and formed with an annular collar 104, which, in turn, integrally connects to a support base 106 through a central post 108. The fastening clip assembly 100 may be integrally molded and formed as a single, unitary body. For example, the fastening clip assembly 100 may be integrally molded and formed as a single piece of injection-molded plastic.

The panel-engaging retainer 102 includes a beveled lead-in nose 110 that is configured to guide the panel-engaging retainer 102 into a round-opening of a component, such as a panel. Four retaining legs 112 extend downwardly from the lead-in nose 110 and/or an end of a central pedestal 122 at an outwardly-flared angle. Each leg 112 includes a flexible root 114 that connects to the lead-in nose 110. The root 114 connects to a downwardly and outwardly angled (with the outward spread increasing from top towards bottom, as shown) extension beam 116, which, in turn, connects to an inwardly-canted ramp 118 at a lower distal end. The ramps 118 inwardly-cant toward a central longitudinal axis 120 of the fastening clip assembly 100. The four retaining legs 112 are regularly spaced about the central longitudinal axis 120 of the fastening clip assembly 100.

A central pedestal 122 extends downwardly from the lead-in nose and connects to a center of the annular collar 104. The central pedestal 122 may be centered about the longitudinal axis 120 and may generally be aligned with the central post 108.

The annular collar 104 includes a base 124 having an upstanding angled rim 126 extending upwardly and outwardly from the base 124. An annular seal may be secured to the rim 126.

Figure 2:
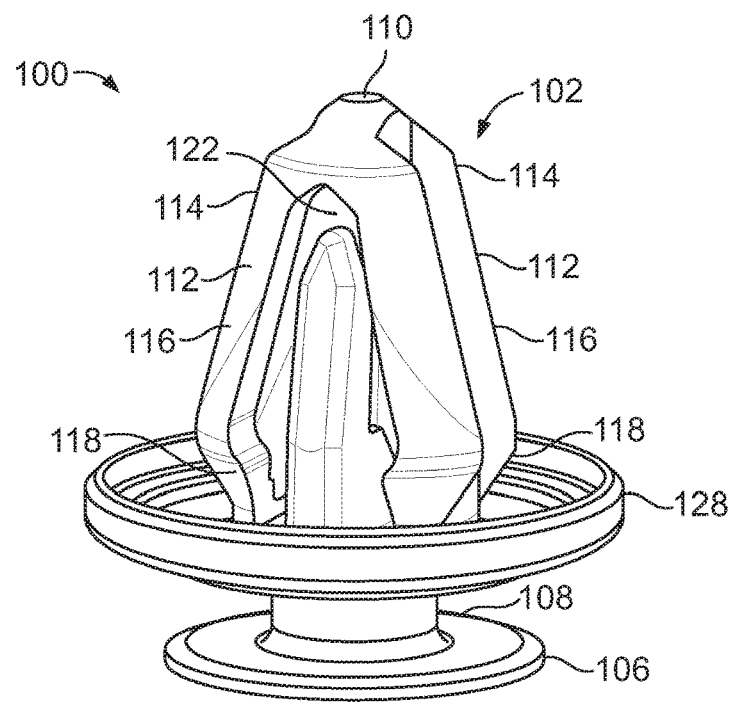
FIG. 2 illustrates a perspective front view of a fastening clip assembly having an annular seal, according to an embodiment of the present disclosure.

FIG. 2 illustrates a perspective front view of the fastening clip assembly 100 having the annular seal 128, according to an embodiment of the present disclosure. The annular seal 128 may be formed of an elastomeric material. In at least one embodiment, the annular seal 128 may be overmolded onto the rim 126. Alternatively, the fastening clip assembly 100 may not include the annular seal 128.

Figure 3:
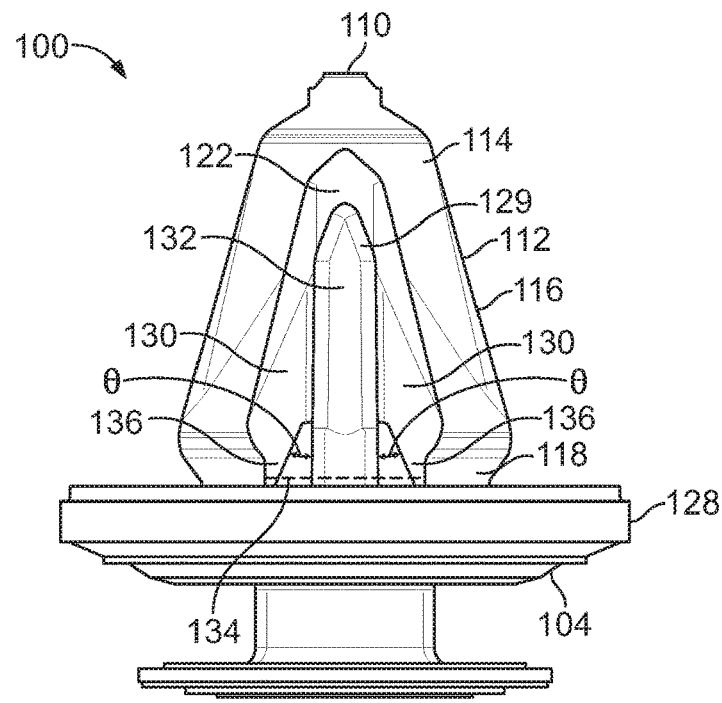
FIG. 3 illustrates a front view of a fastening clip assembly, according to an embodiment of the present disclosure.

FIG. 3 illustrates a front view of the fastening clip assembly 100, according to an embodiment of the present disclosure. As shown, the central pedestal 122 extends from a lower interior surface of the lead-in nose 110 to the base 124 (hidden from view in FIG. 3) of the collar 104. As such, the central pedestal 122 provides a brace that protects the lead-in nose 110 from collapsing towards the collar 104. The central pedestal 122 provides a bracing support that resists crushing.

The central pedestal 122 includes a central beam 129 and two retaining beams 130 that downwardly and outwardly cant from the central beam 129. Each of the retaining beams 130 downwardly extend from the central beam 129 at an angle θ. As such, the retaining beams 130 form a triangular structure having an apex 132 at the point where each connects to the central beam 129. Each of the retaining beams 130 forms a side of the triangle, with a base of the triangle being an imaginary line 134 extending between exposed distal ends 136 of the retaining beams 130.

Figure 4:
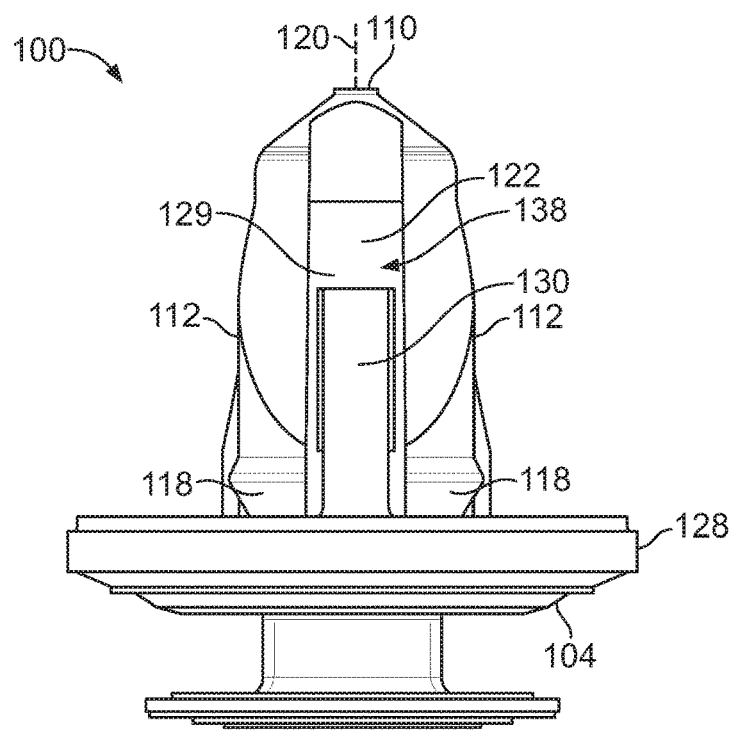
FIG. 4 illustrates a lateral view of a fastening clip assembly, according to an embodiment of the present disclosure.
Figure 5:
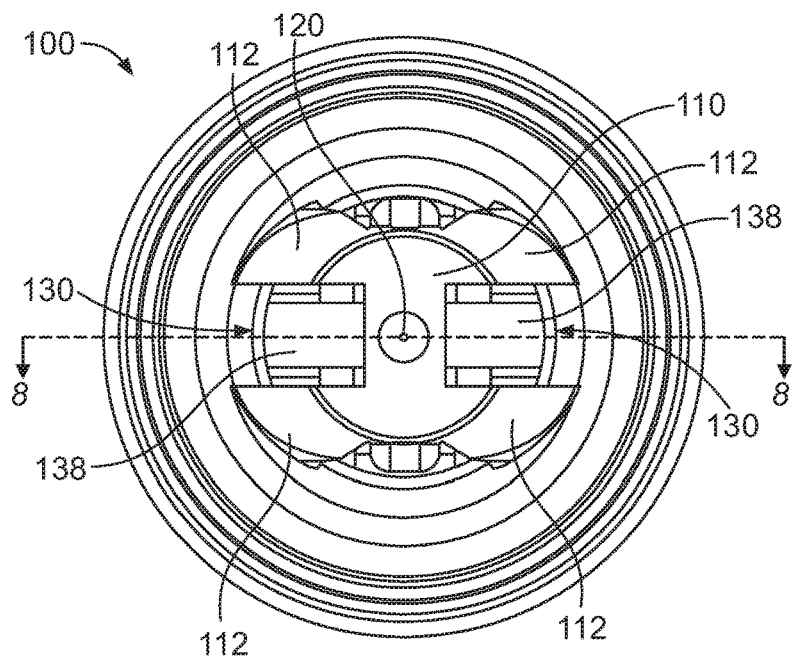
FIG. 5 illustrates a top view of a fastening clip assembly, according to an embodiment of the present disclosure.

FIG. 4 illustrates a lateral view of the fastening clip assembly 100, according to an embodiment of the present disclosure. FIG. 5 illustrates a top view of the fastening clip assembly 100. Referring to FIGS. 4 and 5, the central beam 129 and retaining beams 130 of the central pedestal 122 may be exposed within gaps 138 between neighboring (that is, closest) legs 112. As shown and described, the fastening clip assembly 100 may include four legs 112 regularly spaced about the central longitudinal axis (such that central vertical planes of neighboring legs are spaced 45° from one another), and two retaining beams 130, which may be spaced 180° from one another).

Figure 6:
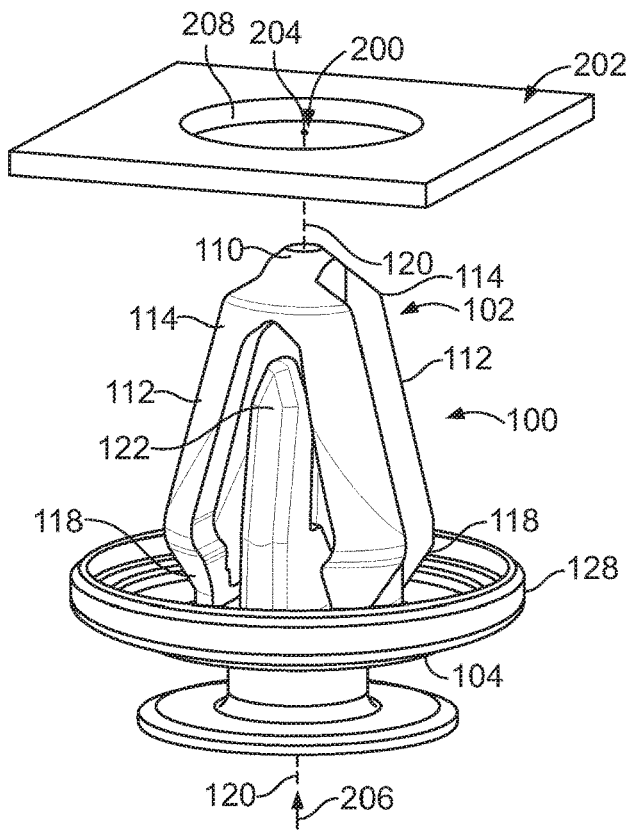
FIG. 6 illustrates a perspective front view of a fastening clip assembly aligned with a round opening of a panel, according to an embodiment of the present disclosure.

FIG. 6 illustrates a perspective front view of the fastening clip assembly 100 aligned with a round opening 200 of a panel 202, according to an embodiment of the present disclosure. The axial cross-sectional of the round opening 200 is circular. In order to connect the fastening clip assembly 100 to the panel 202, the lead-in nose 110 is aligned with the round opening 200. For example, the central longitudinal axis 120 of the fastening clip assembly 100 may be aligned with a center 204 of the round opening 200. After the fastening clip assembly 100 is aligned with the round opening 200, the fastening clip assembly 100 is urged into the round opening in the direction of arrow 206. If the fastening clip assembly 100 is misaligned, the beveled lead-in nose 110 automatically directs the panel-engaging retainer into alignment, as the beveled surfaces of the lead-in nose 110 slide over interior edges 208 of the panel 202 that define the round opening 200.

With continued urging in the direction of arrow 206, the legs 112 slide over the interior edges 208. As the legs 112 slide over the interior edges 208, the legs 112 inwardly pivot about the roots 114, thereby compressing toward one another. With continued urging in the direction of arrow 206, the inwardly-canted ramps 118 slide over the interior edges 208, and the legs expand outwardly back towards initial positions, as the legs 114 outwardly pivot about the roots 114.

Figure 7:
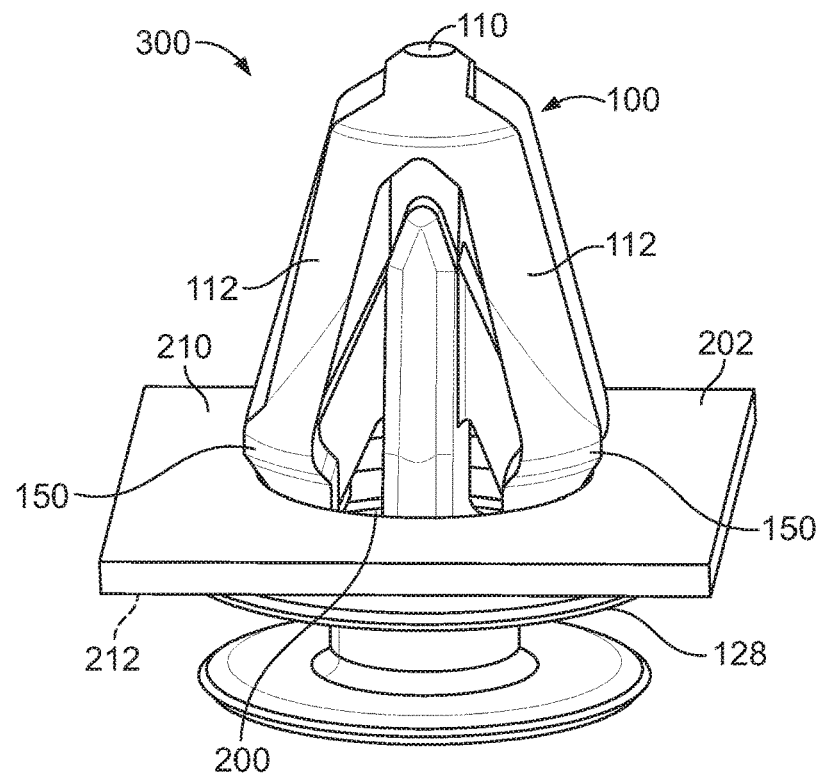
FIG. 7 illustrates a perspective front view of a fastening clip assembly secured to a panel, according to an embodiment of the present disclosure.

FIG. 7 illustrates a perspective front view of the fastening clip assembly 100 secured to the panel 202, according to an embodiment of the present disclosure. The fastening clip assembly 100 secured to the panel 202 provides a securing system 300 that may be configured to securely connect another component to the panel 202. As shown, the legs 112 exert a downwardly-directed force toward a top surface 210 of the panel 202 at areas surrounding the round opening 200. In particular, the ramps 118 are compressed against the interior edges 208. Outer ledges 150 of the legs 112 combine to form an outer circumferential envelope having a diameter that is greater than the diameter of the round opening 200, thereby preventing the legs 112 from passing deeper into the round opening 200.

The panel 202 is therefore compressively sandwiched between the ramps 118 and the annular seal 128 (or, alternatively, the angled rim 126, shown in FIG. 1). The annular seal 128 abuts into a lower surface 212 of the panel opposite the top surface 210.

The four legs 112 provide four points of contact between the fastening clip assembly 100 and the panel 200. In particular, the ramps 118 of each of the four legs 112 directly contact the interior edges 208 of the round opening 202 of the panel 200.

Figure 8:
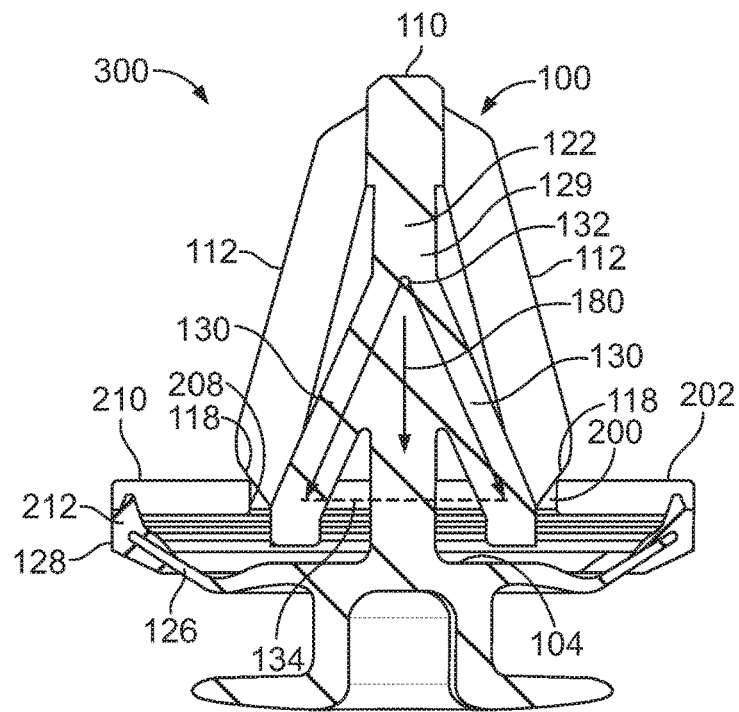
FIG. 8 illustrates a cross-sectional view of a fastening clip assembly through line 8-8 of FIG. 5 secured to a panel, according to an embodiment of the present disclosure.

FIG. 8 illustrates a cross-sectional view of the fastening clip assembly 100 through line 8-8 of FIG. 5 secured to the panel 202, according to an embodiment of the present disclosure. As shown, the retaining beams 130 apply an outwardly angled retaining force towards the interior edges 208 of the panel 200 that define the round opening 200. As shown, the retaining force exerted by the retaining beams 130 towards the interior edges 208 may be triangular. The retaining beams 130 may provide an isosceles triangle having the apex 132 at the central point of intersection with the central beam 129, each retaining beam 130 forming a leg of the isosceles triangle, and the imaginary line 134 forming the base of the isosceles triangle.

As an extraction force is applied in the direction of arrow 180, the retaining beams 130 exert a triangular resisting force that resists the extraction force. As such, the retaining beams 130 exert a triangular retaining force into the panel 202. The triangular retaining force allows for a low insertion force and a high extraction force in relation to the round opening 200. As such, the fastening clip assembly 100 may be quickly and easily secured to the panel 202, but difficult to inadvertently extract. Secure retention is achieved by the four retention legs 112, which may equalize all angles of extraction load.

The ramps 118 provide inwardly-canted surfaces that allow for the fastening clip assembly 100 to be removed, if desired, and reused. For example, the ramps 118 provide smooth, angled surfaces that allow for desired removal and reuse, in stark contrast to structures that hook or latch onto the panel that may then snag and break when a removal force is exerted into the fastening clip assembly.

Additionally, the central pedestal 122 protects the fastening clip assembly 100 from being crushed if the fastening clip assembly 100 is misaligned during installation. The central pedestal 122 provides a bracing support between the lead-in nose 110 and the collar 104 that prevents, minimizes, or otherwise reduces the possibility that the fastening clip assembly 100 may be crushed or collapse upon itself.

Referring to FIGS. 1-8, embodiments of the present disclosure provide a fastening clip assembly integrally formed as a single piece, which provides four points of retention with respect to a component (such as a panel), and which exerts a triangular retaining force into a component. The fastening clip assembly is particularly suited for insertion into round openings.

The fastening clip assembly provides four points of retention that are strengthened and buttressed by the triangular retaining force, thereby providing equal retention from all directions of loading. The fastening clip assembly may also include a central beam (such as a central pedestal, post, or the like) that prevents crushing if the fastening clip assembly is misaligned with an opening of a panel. Embodiments of the present disclosure may be used to attach automotive interior door panels to sheet metal, for example.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastening clip assembly configured to secure to a component, the fastening clip assembly comprising:
   four retaining legs that extend from a lead-in nose which are configured to directly contact portions of the component to provide four points of contact with a component; and
   a central pedestal that extends from the lead-in nose, which includes a central beam that is centered about a longitudinal axis and two angled retaining beams that each extend downward and outward from the central beam at a point spaced from the lead-in nose and at an angle from the longitudinal axis, wherein the two angled retaining beams are configured to exert an outward retaining force into the component.

2. The fastening clip assembly of claim 1, wherein the four retaining legs and the central pedestal are integrally molded and formed together.

3. The fastening clip assembly of claim 1, wherein the four retaining legs and the central pedestal are configured to securely connect the fastening clip assembly to a round opening of the component.

4. The fastening clip assembly of claim 1, wherein the lead-in nose is beveled and configured to guide the fastening clip assembly into a round opening of the component.

5. The fastening clip assembly of claim 1, wherein each of four retaining legs comprises a flexible root connected to an outwardly-extending angled extension beam, which, in turn, connects to an inwardly-canted ramp, wherein the inwardly-canted ramp is configured to compressively abut into an internal edge of a round opening of the component.

6. The fastening clip assembly of claim 1, wherein the four retaining legs are regularly spaced about a central longitudinal axis of the fastening clip assembly.

7. The fastening clip assembly of claim 1, further comprising an annular collar, wherein the central beam provides a bracing support between the lead-in nose and the annular collar, wherein the bracing support resists crushing.

8. The fastening clip assembly of claim 7, further comprising an annular seal secured to the annular collar.

9. The fastening clip assembly of claim 1, wherein the two angled retaining beams form two legs having a length that is the same.

10. A securing system comprising:
a component having a round opening; and
a fastening clip assembly secured to the component, the fastening clip assembly comprising:
four retaining legs that extend from a lead-in nose and directly contact portions of the component proximate to the round opening to provide four points of contact with the component; and
a central pedestal that extends from the lead-in nose, which includes a central beam that is centered about a longitudinal axis and two angled retaining beams that each extend downward and outward from the central beam at a point spaced from the lead-in nose and at an angle from the longitudinal axis, wherein the two angled retaining beams exert an outward retaining force into the component.

11. The securing system of claim 10, wherein the four retaining legs and the central pedestal are integrally molded and formed together.

12. The securing system of claim 10, wherein the four retaining legs and the central pedestal securely connect the fastening clip assembly to the round opening of the component.

13. The securing system of claim 10, wherein the lead-in nose is beveled and connected to the central pedestal, and wherein the beveled lead-in nose guides the fastening clip assembly into the round opening of the component.

14. The securing system of claim 10, wherein each of four retaining legs comprises a flexible root connected to an outwardly-extending angled extension beam, which, in turn, connects to an inwardly-canted ramp, wherein the inwardly-canted ramp compressively abuts into an internal edge of the round opening of the component.

15. The securing system of claim 10, wherein the four retaining legs are regularly spaced about a central longitudinal axis of the fastening clip assembly.

16. The securing system of claim 10, wherein the fastening clip assembly further comprises a lead-in nose and an annular collar, wherein the central beam provides a bracing support between the lead-in nose and the annular collar, wherein the bracing support resists crushing.

17. The securing system of claim 16, wherein the fastening clip assembly further comprising an annular seal secured to the annular collar.

18. The securing system of claim 16, wherein the two angled retaining beams form two legs having a length that is the same.

19. A fastening clip assembly configured to secure to a component, the fastening clip assembly comprising:
four retaining legs that extend downwardly from a lead-in nose and are configured to directly contact portions of the component to provide four points of contact with the component, wherein each of four retaining legs comprises a flexible root connected to an outwardly-extending angled extension beam, which, in turn, connects to an inwardly-canted ramp, wherein the inwardly-canted ramp is configured to compressively abut into an internal edge of a round opening of the component, wherein the four retaining legs are regularly spaced about a central longitudinal axis of the fastening clip assembly;
a central pedestal that extends from the lead-in nose, which includes a central beam that is centered about a longitudinal axis and two angled retaining beams that each extend downward and outward from the central beam at a point spaced from the lead-in nose and at an angle from the longitudinal axis, wherein the two angled retaining beams form two legs having a length that is the same, wherein the two angled retaining beams are configured to exert a triangular retaining force into the component, wherein the four retaining legs and the central pedestal are configured to securely connect the fastening clip assembly to the round opening of the component;
an annular collar connected to the central pedestal; and
a beveled lead-in nose connected to the central pedestal, wherein the beveled lead-in nose is configured to guide the fastening clip assembly into the round opening of the component, wherein the central beam provides a bracing support between the lead-in nose and the annular collar, wherein the bracing support resists crushing,
wherein the four retaining legs, the central pedestal, the annular collar, and the beveled lead-in nose are integrally molded and formed together as a single piece.

20. The fastening clip assembly of claim 19, further comprising an annular seal secured to the annular collar.

* * * * *